US012637092B2

(12) United States Patent
Fukumoto et al.

(10) Patent No.: US 12,637,092 B2
(45) Date of Patent: May 26, 2026

(54) PARKING ASSISTANCE METHOD AND PARKING ASSISTANCE DEVICE

(71) Applicant: Panasonic Automotive Systems Co., Ltd., Kanagawa (JP)

(72) Inventors: Satoshi Fukumoto, Tokyo To (JP); Shota Akaura, Kanagawa Ken (JP)

(73) Assignee: Panasonic Automotive Systems Co., Ltd., Kanagawa (JP)

( * ) Notice: Subject to any disclaimer, the term of this patent is extended or adjusted under 35 U.S.C. 154(b) by 65 days.

(21) Appl. No.: 18/924,728

(22) Filed: Oct. 23, 2024

(65) Prior Publication Data

US 2025/0145166 A1     May 8, 2025

(30) Foreign Application Priority Data

Nov. 2, 2023     (JP) ................................. 2023-188671

(51) Int. Cl.
| | | |
|---|---|---|
| *B60W 50/00* | (2006.01) | |
| *B60K 35/28* | (2024.01) | |
| *B60W 30/06* | (2006.01) | |
| *B60W 50/14* | (2020.01) | |

(52) U.S. Cl.
CPC ......... *B60W 50/0098* (2013.01); *B60K 35/28* (2024.01); *B60W 30/06* (2013.01); *B60W 50/14* (2013.01); *B60K 2360/119* (2024.01); *B60K 2360/171* (2024.01); *B60K 2360/176* (2024.01); *B60W 2050/146* (2013.01); *B60W 2555/20* (2020.02); *B60W 2556/10* (2020.02)

(58) Field of Classification Search
None
See application file for complete search history.

(56) References Cited

U.S. PATENT DOCUMENTS

| | | | |
|---|---|---|---|
| 9,140,553 B2 | 9/2015 | Grimm et al. | |
| 2022/0144250 A1* | 5/2022 | Hidaka | ............. B60W 50/0225 |
| 2024/0010205 A1* | 1/2024 | Ucar | ...................... G05B 17/02 |

FOREIGN PATENT DOCUMENTS

JP          6022447          11/2016

* cited by examiner

*Primary Examiner* — Hitesh Patel
*Assistant Examiner* — Wenyuan Yang
(74) *Attorney, Agent, or Firm* — Greenblum & Bernstein, P.L.C.

(57) ABSTRACT

A parking assistance method according to the present disclosure performs automated travel of a vehicle based on a parking operation performed in past. The parking assistance method includes acquiring a teacher path based on a travel path in the parking operation performed in the past, acquiring vehicle operation information regarding an operation of at least one vehicle accessory of a blinker and a side mirror in the vehicle during the parking operation performed in the past, storing teacher data including the teacher path and the vehicle operation information, and reproducing an operation of the vehicle accessory caused by the operation acquired during the parking operation performed in the past, based on the teacher data in automated parking in which the vehicle is moved along the teacher path.

19 Claims, 5 Drawing Sheets

PARKING ASSISTANCE DEVICE

301
ACQUISITION
MODULE

302
RECEPTION
MODULE

303
MAP INFORMATION
GENERATION
MODULE

304
TRAVEL PATH
DETECTION
MODULE

305
VEHICLE
OPERATION DE-
TECTION MODULE

306
STORAGE UNIT

307
SELF-POSITION
ESTIMATION
MODULE

308
PATH FOLLOWING
CALCULATION
MODULE

309
VEHICLE
OPERATION
REPRODUCTION
MODULE

310
OUTPUT
CONTROL MODULE

311
VEHICLE
CONTROL MODULE

PARKING ASSISTANCE METHOD AND PARKING ASSISTANCE DEVICE

CROSS-REFERENCE TO RELATED APPLICATIONS

This application is based upon and claims the benefit of priority from Japanese Patent Application No. 2023-188671, filed Nov. 2, 2023, the entire contents of which are incorporated herein by reference.

FIELD

Embodiments described herein relate generally to a parking assistance method and a parking assistance device.

BACKGROUND

In an existing technology, there have been known parking assistance techniques of moving a vehicle by automated driving when parking the vehicle is known. As one of such parking assistance techniques, there is a regeneration travel technique of learning a travel path based on teacher travel by a driver and moving a vehicle along the travel path learned based on the teacher travel. Such a technique related to path storage-type automated parking is used, for example, in a case where parking is repeatedly performed at a determined parking position such as a parking lot of the home or working place of a user. Conventional technologies are described in Japanese Patent No. 6022447, for example.

However, the parking assistance technique for performing the path storage-type automated parking has room for improvement in the assistance content. For example, the parking assistance technique has room for improvement from the viewpoint of safety because it is difficult for surrounding people and vehicles to grasp the behavior of the vehicle during regeneration travel. In addition, for example, the parking assistance technique has room for improvement from the viewpoint of convenience because a driver may be required to operate the vehicle due to an occurrence of a situation in which the surrounding situation of the vehicle during the regeneration travel is different from that during the teacher travel.

One of objects to be achieved by the present disclosure is to appropriately support path storage-type automated parking.

SUMMARY

A parking assistance method according to an embodiment of the present disclosure performs automated travel of a vehicle based on a parking operation performed in past. The method includes: acquiring a teacher path based on a travel path in the parking operation performed in the past; acquiring vehicle operation information regarding an operation of at least one vehicle accessory of a blinker and a side mirror in the vehicle during the parking operation performed in the past; storing teacher data including the teacher path and the vehicle operation information; and reproducing an operation of the vehicle accessory caused by the operation acquired during the parking operation performed in the past, based on the teacher data in automated parking in which the vehicle is moved along the teacher path.

DETAILED DESCRIPTION

Figure 1:
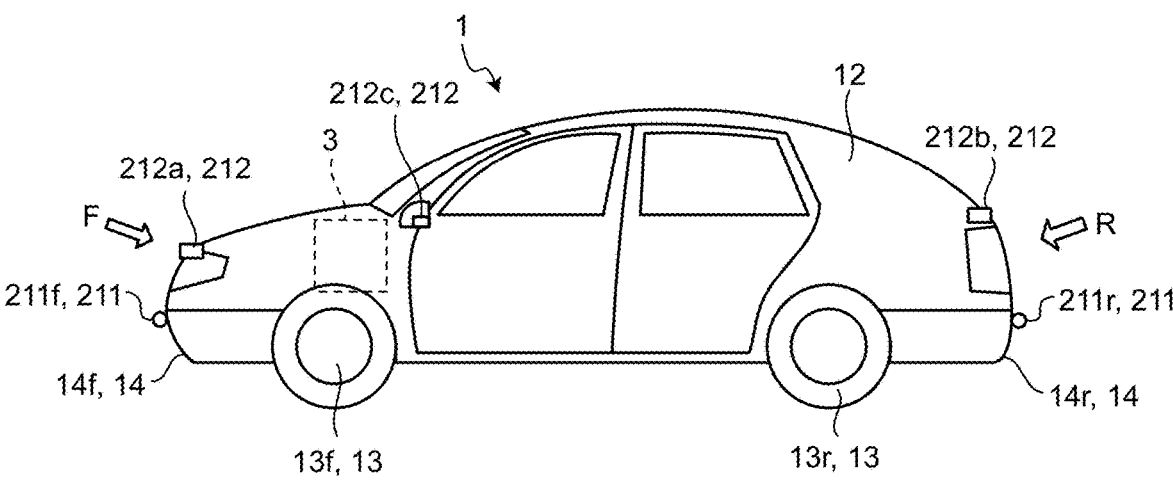
FIG. 1 is a diagram schematically illustrating an example of a vehicle mounted with a parking assistance device according to an embodiment.

Hereinafter, embodiments of a parking assistance device, a vehicle, a parking assistance method, a computer program product, and a recording medium according to the present disclosure will be described with reference to the accompanying drawings.

Note that, in the description of the present disclosure, constituent elements having the same or substantially the same functions as those described above with respect to the previous drawings are denoted by the same reference numerals, and the description thereof may be appropriately omitted. In addition, even in the case of representing the same or substantially the same portion, the dimensions and ratios may be represented differently from each other depending on the drawings. Furthermore, for example, from the viewpoint of securing visibility of the drawings, in the description of each drawing, only main constituent elements are denoted by reference numerals, and constituent elements having the same or substantially the same functions as those described above in the previous drawings may not be denoted by reference numerals.

Note that, in the description of the present disclosure, constituent elements having the same or substantially the same function may be distinguished and denoted by adding alphanumeric characters to the end of reference numerals. Alternatively, in a case where a plurality of constituent elements having the same or substantially the same function are not distinguished, the constituent elements may be integrated and denoted by omitting alphanumeric characters added to the end of the reference numerals.

FIG. 1 is a diagram schematically illustrating an example of a vehicle 1 mounted with a parking assistance device 3 according to an embodiment. As illustrated in FIG. 1, the vehicle 1 includes a vehicle body 12 and two pairs of wheels 13 disposed along a predetermined direction on the vehicle body 12. The two pairs of wheels 13 include a pair of front tires 13f and a pair of rear tires 13r.

Here, the front tire 13f according to the embodiment is an example of a first wheel. In addition, the rear tire 13r according to the embodiment is an example of a second wheel. Note that, although FIG. 1 illustrates the vehicle 1 having the four wheels 13, the present invention is not limited thereto. The vehicle 1 only needs to have at least one front tire 13f and at least one rear tire 13r. The number of wheels 13 of the vehicle 1 may be two, three, or five or more.

A direction of at least one wheel (steered wheel) of the wheels 13 of the vehicle 1 electrically or mechanically interlocks with, for example, a rotation angle of the steering wheel disposed in front of a driver seat 130a, that is, a steering angle. That is, the vehicle 1 can be turned right or left by steering. Note that the steered wheel may be the rear tire 13r or both the front tire 13f and the rear tire 13r.

The vehicle body 12 is supported by the wheels 13. The vehicle 1 includes a driving machine (not illustrated), and is movable by driving at least one wheel (driving wheel) of the wheels 13 of the vehicle 1 by power of the driving machine. Note that, as the driving machine, any driving machine such as an engine using gasoline, hydrogen, or the like as a fuel, a motor using electric power from a battery, or a combination of an engine and a motor can be applied. In this case, a predetermined direction in which the two pairs of wheels 13 are arranged is a traveling direction of the vehicle 1. The vehicle 1 can move forward or backward by switching gears (not illustrated) or the like.

In addition, the vehicle body 12 has a front end portion F which is an end portion on the front tire 13f side and a rear end portion R which is an end portion on the rear tire 13r side. The vehicle body 12 has a substantially rectangular shape in top view, and four corners of the substantially rectangular shape may be referred to as end portions.

A pair of bumpers 14 is provided near the lower end of the vehicle body 12 at the front and rear end portions F and R of the vehicle body 12. The front bumper 14f of the pair of bumpers 14 covers the entirety of the front surface and a part of the side surface near the lower end portion of the vehicle body 12. The rear bumper 14r of the pair of bumpers 14 covers the entirety of the rear surface and a part of the side surface near the lower end portion of the vehicle body 12.

Figure 2:
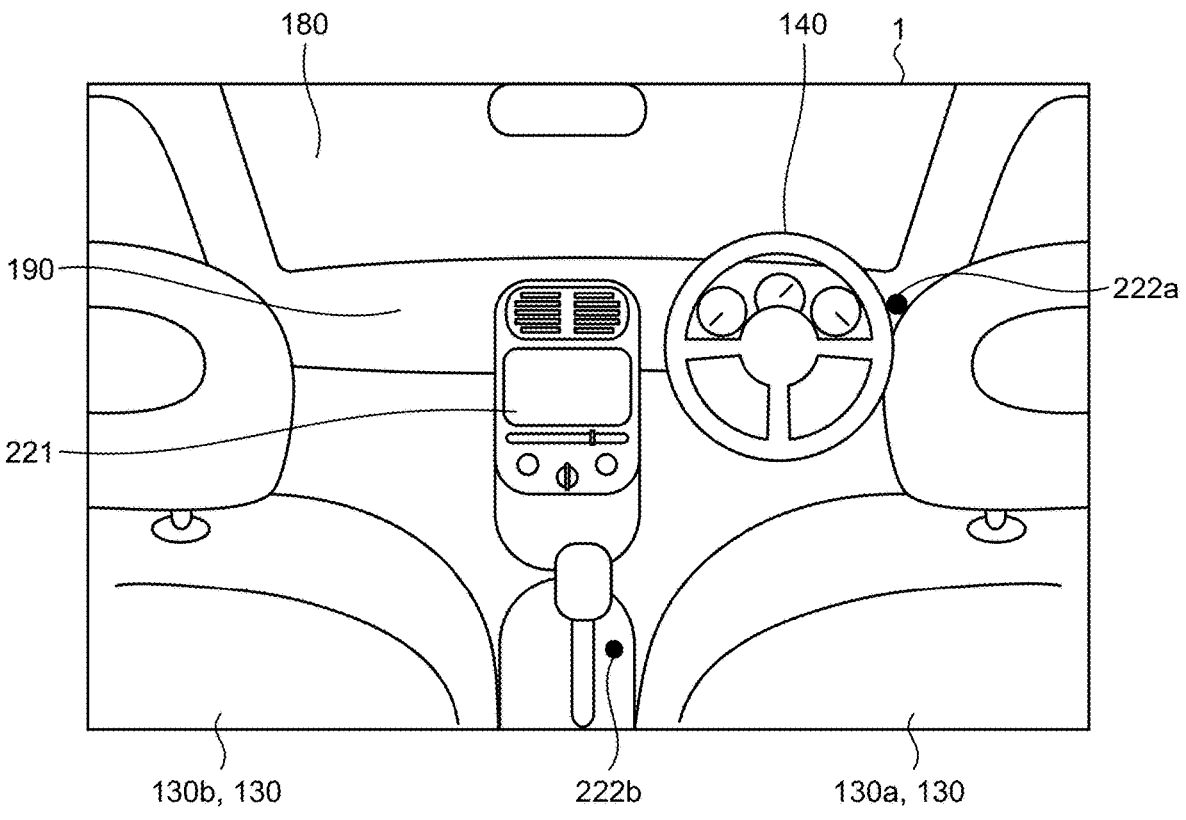
FIG. 2 is a diagram illustrating an example of a configuration near a driver seat of the vehicle of FIG. 1.

Here, a configuration near the driver seat of the vehicle 1 in the present embodiment will be described. FIG. 2 is a diagram illustrating an example of a configuration near the driver seat 130a of the vehicle 1 according to the embodiment.

As illustrated in FIG. 2, the vehicle 1 includes at least one seat 130. FIG. 2 illustrates the driver seat 130a and a passenger seat 130b as the seat 130. In addition, a steering wheel 140, a windshield 180, a dashboard 190, a display device 221, and operation buttons 222a and 222b are provided in front of the driver seat 130a.

The steering wheel 140 is provided in front of the driver seat 130a and can be operated by the driver. The rotation angle of the steering wheel 140, that is, the steering angle electrically or mechanically interlocks with a change in the direction of the front tire 13f which is a steered wheel. Note that the steered wheel may be the rear tire 13r or both the front tire 13f and the rear tire 13r.

As illustrated in FIG. 1, the vehicle 1 is mounted with the parking assistance device 3. The parking assistance device 3 is an information processing device that can be mounted on the vehicle 1, and is realized by, for example, an electronic control unit (ECU) or an on board unit (OBU), which is provided inside the vehicle 1. Note that the parking assistance device 3 may be realized by a domain control unit (DCU) such as a cockpit domain controller (CDC) in which a plurality of ECUs are integrated. The CDC is configured to be able to execute processes such as in-vehicle infotainment (IVI), meter control, display device control of a head up display (HUD), an electronic mirror, or the like, and advanced driver-assistance systems (ADAS). Alternatively, the parking assistance device 3 may be an external computer installed near the dashboard 190 of the vehicle 1 or may also serve as another device such as a car navigation device. Note that the parking assistance device 3 may be configured integrally with an HMI 22 (see FIG. 3) or configured to be able to cooperate with the HMI 22 by communication, and may be realized as an information presentation device that can be mounted on the vehicle 1.

Figure 3:
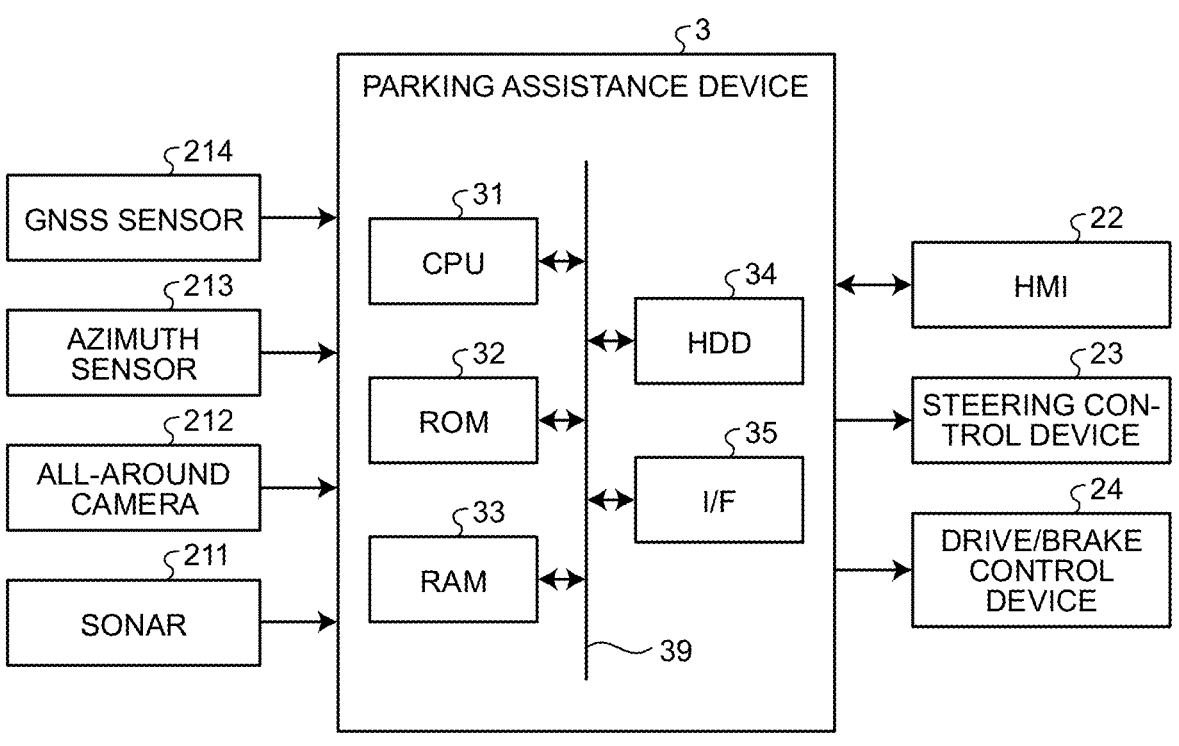
FIG. 3 is a diagram illustrating an example of a hardware configuration of the parking assistance device of FIG. 1.

FIG. 3 is a diagram illustrating an example of a hardware configuration of the parking assistance device 3 according to the embodiment. As illustrated in FIG. 3, the parking assistance device 3 includes a central processing unit (CPU) 31, a read only memory (ROM) 32, a random access memory (RAM) 33, a hard disk drive (HDD) 34, and an interface (I/F) 35. The CPU 31, the ROM 32, the RAM 33, the HDD 34, and the I/F 35 are mutually connected by a bus 39 or the like, and have a hardware configuration using a normal computer.

The CPU 31 is an arithmetic operation device that controls the entirety of the parking assistance device 3. The CPU 31 loads a program stored in the ROM 32 or the HDD 34 into the RAM 33 and executes the program, thereby implementing each process described later.

Note that the CPU 31 according to the embodiment is an example of at least one processor in the parking assistance device 3. As the at least one processor, another processor may be provided instead of the CPU 31 or in addition to the CPU 31. As other processors, various processors such as a CPU, a graphics processing unit (GPU), and a digital signal processor (DSP), a dedicated arithmetic circuit implemented by an application specific integrated circuit (ASIC) and a field programmable gate array (FPGA), and the like can be used as appropriate.

The ROM 32 stores programs, parameters, and the like that implement various processes by the CPU 31. The ROM 32 according to the embodiment is an example of at least one memory in the parking assistance device 3.

The RAM 33 is, for example, a main storage device of the parking assistance device 3, and temporarily stores data necessary for various processes by the CPU 31. The RAM 33 according to the embodiment is an example of at least one memory in the parking assistance device 3.

The HDD 34 stores various types of data, programs, and the like used by the parking assistance device 3. As an example, the HDD 34 stores information obtained from various in-vehicle sensors mounted on the vehicle 1, such as a sonar 211, an all-around camera 212, an azimuth sensor 213, and a GNSS sensor 214. Note that, instead of the HDD 34 or in addition to the HDD 34, various storage media and storage devices such as a solid state drive (SSD) and a flash memory can be used as appropriate. Various storage media and storage devices such as the HDD 34 according to the embodiment are examples of at least one memory in the parking assistance device 3.

The I/F 35 is an interface for transmitting and receiving data. The I/F 35 receives data from another device provided in the vehicle 1, for example, an in-vehicle sensor of the vehicle 1 or the HMI 22. In addition, the I/F 35 transmits data to other devices provided in the vehicle 1, for example, the HMI 22, a steering control device 23, and a drive/brake control device 24.

Note that the I/F 35 may transmit and receive information to and from another ECU mounted on the vehicle 1 via an in-vehicle network including a controller area network (CAN), Ethernet (registered trademark), Universal Serial Bus (USB, registered trademark), or the like in the vehicle 1, or may communicate with an information processing device outside the vehicle 1 via a network such as the Internet. For example, the parking assistance device 3 is connected to each of the sonar 211, the all-around camera 212, the azimuth sensor 213, the GNSS sensor 214, the HMI 22, the steering control device 23, and the drive/brake control device 24 of the vehicle 1 via the in-vehicle network.

As an example, the I/F 35 may acquire information regarding the state of the vehicle 1, such as a vehicle speed pulse, each of speeds including a yaw rate, an acceleration, position information, and shift information, from another ECU or an in-vehicle sensor via the in-vehicle network, for example.

As an example, the I/F 35 may acquire information regarding the surrounding situation of the vehicle 1, such as a detection result of a surrounding obstacle and a surrounding image, from another ECU or an in-vehicle sensor via the in-vehicle network, for example. The obstacle is, for example, an object around the vehicle 1, and includes a moving body such as a person or a vehicle, or a structure.

As an example, the I/F 35 may acquire information (vehicle operation information) regarding a vehicle operation on the vehicle 1 from another ECU, the HMI 22, or an in-vehicle sensor via the in-vehicle network, for example. The vehicle operation information will be described later.

The vehicle 1 is mounted with a plurality of in-vehicle sensors. FIGS. 1 and 3 illustrate the sonar 211 and the all-around camera 212. FIG. 3 further illustrates the azimuth sensor 213 and the GNSS sensor 214.

The sonar 211 is provided, for example, at a predetermined end portion of the vehicle body 12, and transmits and receives a sound wave such as an ultrasonic wave. The sonar 211 includes wave transmission/reception modules 211f and 211r. For example, at least one wave transmission/reception module 211f is disposed on the front bumper 14f, and at least one wave transmission/reception module 211r is disposed on the rear bumper 14r. Furthermore, the number and/or positions of the wave transmission/reception modules 211f and 211r are not limited to the example illustrated in FIG. 1, and can be changed as appropriate. For example, the vehicle 1 may include the wave transmission/reception modules 211f and 211r on the left and right sides.

The sonar 211 detects an obstacle around the vehicle 1 based on the transmission/reception result of the sound wave. In addition, the sonar 211 measures a distance between an obstacle around the vehicle 1 and the vehicle 1 based on the transmission/reception result of the sound wave.

Note that, in the present embodiment, the sonar 211 using a sound wave such as an ultrasonic wave is exemplified, but the present invention is not limited thereto. For example, the vehicle 1 may include a radar that transmits and receives electromagnetic waves instead of the sonar 211 or in addition to the sonar 211.

The all-around camera 212 is provided in the vehicle 1 to be able to image the surroundings of the vehicle 1. As an example, the vehicle 1 includes, as the all-around camera 212, a front camera 212a that images the front, a rear camera 212b that images the rear, a left side camera 212c that images the left side, and a right side camera (not illustrated) that images the right side.

The all-around camera 212 images the surroundings of the vehicle 1. The all-around camera 212 is, for example, a camera that captures an image based on visible light and/or infrared light. Note that the image captured by the all-around camera 212 may be a moving image or a still image.

Note that the position and/or number of the all-around cameras 212 is not limited to the example illustrated in FIG. 1 and can be changed as appropriate. For example, the vehicle 1 may include only two cameras, that is, the front camera 212a and the rear camera 212b. Alternatively, the vehicle 1 may further include another camera in addition to the above-described example. For example, some or all of the all-around cameras 212 may be provided in a vehicle interior space (inside the vehicle) of the vehicle 1. In addition, the all-around camera 212 may be a camera built in the vehicle 1, a camera of a drive recorder retrofitted to the vehicle 1, or the like.

The azimuth sensor 213 detects the orientation of the traveling direction of the vehicle 1. The azimuth sensor 213 is, for example, a sensor that measures the orientation of the traveling direction of the vehicle 1 from a rotation difference between the left and right wheels 13 of the vehicle 1, geomagnetism, a gas rate gyro, an optical fiber gyro, or the like. Note that a known method can be appropriately adopted as a method of obtaining the azimuth of the traveling direction of the vehicle 1, and the present invention is not particularly limited.

The GNSS sensor 214 detects position information indicating the current position of the vehicle 1. As an example, the GNSS sensor 214 is a global navigation satellite system (GNSS) sensor that outputs position information of the vehicle 1, such as a global positioning system (GPS) sensor. Note that the GNSS sensor 214 includes a GNSS antenna that receives a radio wave (GNSS signal) from a satellite, and a GNSS circuit that obtains position information (GNSS coordinates) based on radio waves received from at least two satellites by the GNSS antenna.

Note that the vehicle 1 may include other in-vehicle sensors (not illustrated). As an example, the vehicle 1 may include a steering angle sensor that outputs a signal corresponding to an operation amount of the steering wheel 140 by the driver, that is, a steering angle. As an example, the vehicle 1 may include a wheel speed sensor that outputs a signal corresponding to the rotation speed and the rotation direction of the wheels 13. As an example, the vehicle 1 may include a brake sensor that detects an operation amount of a brake pedal by the driver. As an example, the vehicle 1 may include an accelerator sensor that detects an operation amount of an accelerator pedal by the driver. As an example, the vehicle 1 may include an acceleration sensor that outputs a signal corresponding to an acceleration applied to the vehicle 1. As an example, the vehicle 1 may include a gyro sensor that outputs a signal corresponding to an angular velocity applied to the vehicle 1.

The HMI 22 is an interface for outputting various types of information such as a notification and a warning to the driver of the vehicle 1. The HMI 22 is an interface for receiving a vehicle operation or an input of various types of information by the driver of the vehicle 1. The HMI 22 only needs to be able to output a notification or a warning so as to be recognizable by the driver of the vehicle 1 and receive various operations of the driver of the vehicle 1. For example, the HMI 22 is provided around the driver seat of the vehicle 1, but may be provided in another portion around the driver seat, such as a rear seat.

The HMI 22 includes a display device that outputs various types of information such as a notification and a warning to the driver of the vehicle 1. As an example, the HMI 22 includes a display device 221 that is provided on the dashboard 190 or a console of the vehicle 1 and is configured to be able to output a video. FIG. 2 illustrates the display device 221 disposed at the center of the dashboard 190. The display device 221 is, for example, a liquid crystal display (LCD) or an organic electro luminescence (EL) display. Here, the HMI 22 as the display device according to the embodiment is an example of a display unit. The HMI 22 as the display unit displays various screens based on various types of display information from an output control module 310 which will be described later.

Note that the display device 221 may be configured as a touch panel display. In addition, the display device 221 may be a part of a car navigation device mounted on the vehicle 1. Furthermore, the display may be a projection-type display device such as a Head Up Display (HUD) that projects a video (virtual image) in front of the driver, for example, in a display region provided on the windshield or the dashboard (console).

Note that the HMI 22 is not limited to the display device, and may include another output device such as a speaker configured to be able to output a notification sound, a warning sound, or a voice.

In addition, the HMI 22 includes an input device that receives a vehicle operation and an input of various types of information by the driver of the vehicle 1. As an example, the HMI 22 includes a touch panel of the display device 221 configured as a touch panel display as the input device. As an example, the HMI 22 includes operation buttons 222a and 222b as the input device. FIG. 2 illustrates the operation button 222a disposed on an instrument panel and the operation button 222b provided on the console. Note that the operation buttons 222a and 222b may be provided at other positions such as the steering wheel 140 and the dashboard 190. In addition, in a case where there is another input device, for example, in a case where the touch panel of the display device 221 is available as the input device of the HMI 22, the operation buttons 222a and 222b do not need to be provided. Here, the HMI 22 as the input device according to the embodiment is an example of an operation unit. The HMI 22 as the operation unit outputs a signal corresponding to various operations from the user on the touch panel of the display device 221 and the operation buttons 222a and 222b, and to various operations from the user on an acquisition module 301 or a reception module 302 which will be described later.

Note that the HMI 22 may include other input devices such as other buttons, dials, switches, and microphones. These input devices are disposed, for example, on the dashboard 190, the instrument panel, the steering wheel 140, the console, or the like of the vehicle 1.

Note that, as the output device, the input device, or an input/output device of the HMI 22, an operation terminal capable of receiving, transmitting, or transmitting/receiving a signal from and to the vehicle 1 from the outside of the vehicle 1, such as a tablet terminal, a smartphone, a remote controller, or an electronic key, may be used.

The steering control device 23 controls steering of the vehicle 1. The steering control device 23 deflects the wheels 13 in a direction corresponding to, for example, a control signal corresponding to an operation amount of the steering wheel 140 by the driver, or a control signal from the parking assistance device 3. Note that the steering control device 23 may include a steering actuator (not illustrated) that changes the rotation angle of the steering wheel 140 in accordance with a control signal from the parking assistance device 3.

The drive/brake control device 24 controls the acceleration/deceleration of the vehicle 1. The drive/brake control device 24 includes, for example, a brake actuator (not illustrated) and an accelerator controller (not illustrated). The brake actuator applies braking to the vehicle 1 or decelerates the vehicle 1 by operating a brake, changing a shift (gear ratio), or controlling an output of the driving machine such as the engine or the motor, based on a detection result of the brake sensor (not illustrated) that detects the operation amount of the brake pedal by the driver or a control signal from the parking assistance device 3. The accelerator controller accelerates the vehicle 1 by controlling the output of the driving machine such as the engine or the motor, based on the detection result of the accelerator sensor (not illustrated) that detects the operation amount of the accelerator pedal by the driver or a control signal from the parking assistance device 3.

Note that FIG. 3 illustrates a case where the sonar 211, the all-around camera 212, the azimuth sensor 213, the GNSS sensor 214, the HMI 22, the steering control device 23, and the drive/brake control device 24 are not provided in the parking assistance device 3, but the present invention is not limited thereto. Some or all of the above components may be provided in the parking assistance device 3.

Figure 4:
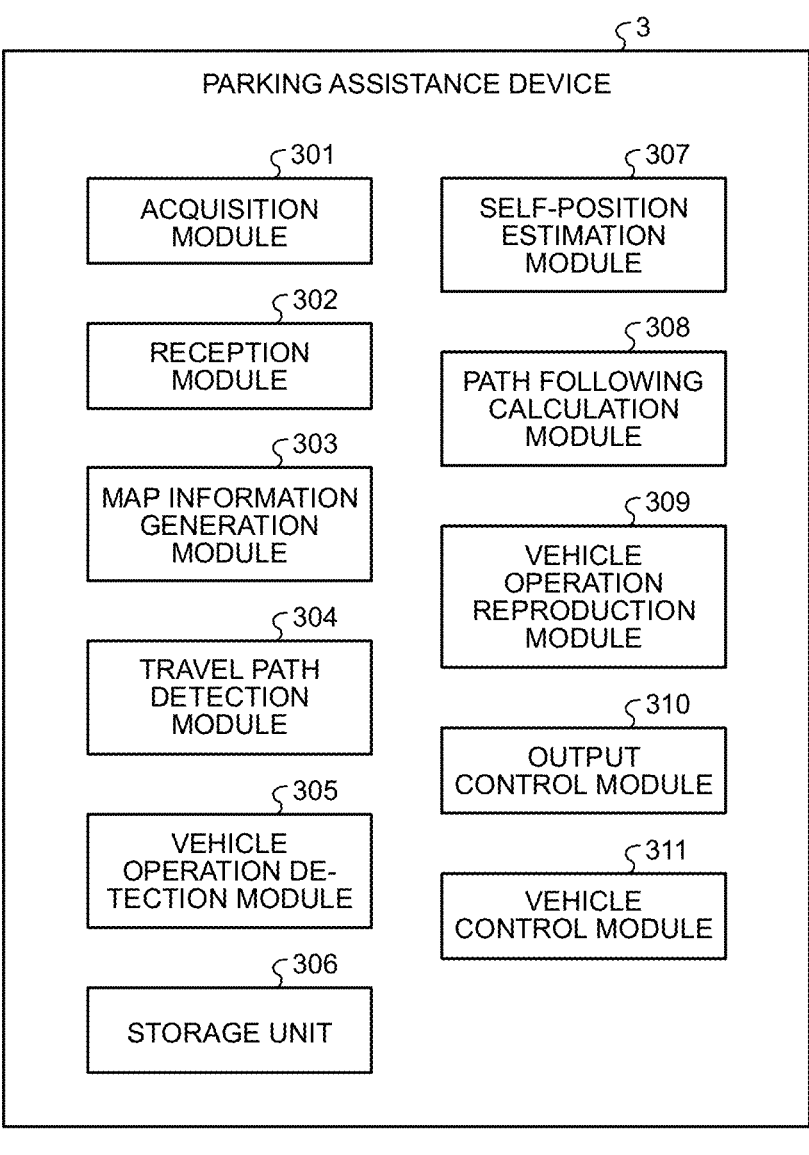
FIG. 4 is a diagram illustrating an example of a functional configuration of the parking assistance device of FIG. 1.

FIG. 4 is a diagram illustrating an example of a functional configuration of the parking assistance device 3 according to the embodiment. The CPU 31 executes the program loaded into the RAM 33, whereby the parking assistance device 3 implements functions as the acquisition module 301, the reception module 302, a map information generation module 303, a travel path detection module 304, a vehicle operation detection module 305, a storage unit 306, a self-position estimation module 307, a path following calculation module 308, a vehicle operation reproduction module 309, the output control module 310, and a vehicle control module 311.

Here, each of the acquisition module 301 and the reception module 302 according to the embodiment is an example of a reception module. In addition, each of the acquisition module 301, the map information generation module 303, the travel path detection module 304, and the vehicle operation detection module 305 according to the embodiment is an example of a learning module. Furthermore, each of the self-position estimation module 307, the path following calculation module 308, the vehicle operation reproduction module 309, and the vehicle control module 311 according to the embodiment is an example of a regeneration module. Furthermore, the output control module 310 according to the embodiment is an example of a display control unit.

The acquisition module 301 acquires data from at least one in-vehicle sensor including other devices provided in the vehicle 1, for example, the sonar 211, the all-around camera 212, the azimuth sensor 213, and the GNSS sensor 214 via, for example, the I/F 35.

As an example, the acquisition module 301 acquires an output from an external sensor (in-vehicle sensor) that detects space information around the vehicle 1, such as the sonar 211 and the all-around camera 212.

As an example, the acquisition module 301 acquires an output from the vehicle sensor (in-vehicle sensor) that detects a distance, a speed, and an azimuth in which the vehicle 1 moves, such as the azimuth sensor 213 and the GNSS sensor 214.

As an example, the acquisition module 301 acquires an output from a blinker lever or a switch (HMI 22) on the steering wheel that receives a vehicle operation instructing on/off of a blinker (direction indicator and vehicle accessory). Note that the acquisition module 301 may acquire information indicating an operation state from the blinker.

The reception module 302 receives various operations from a user such as the driver based on an output of the HMI 22 corresponding to various operations from the user.

As an example, in a case where the operation button 222a is pressed in a state where the vehicle 1 is stopped, the reception module 302 receives this operation as a parking assistance function call instruction for requesting a call of a parking assistance function, which is a menu display on the display such as the display device 221. Note that, instead of pressing the operation button 222a, in a case where the operation button 222b is pressed or a touch operation on an icon on the touch panel of the display device 221 configured as the touch panel display is performed, this operation may be received as a parking assistance function call instruction.

As an example, in a case where the parking assistance function call instruction is received, and then a touch operation on an operation icon on the display screen of the assistance information or pressing of the operation buttons 222a and 222b is performed, the reception module 302 receives the parking assistance function call instruction as a start instruction of a teacher travel mode or a start instruction of an automated driving (regeneration travel) mode according to the operation.

In the present disclosure, the parking assistance function is a function of the parking assistance device 3 that realizes a parking assistance method of automatically traveling a vehicle based on a parking operation performed in the past. The parking assistance function includes the teacher travel mode in which a teacher path is acquired by teacher travel and the regeneration travel mode in which the vehicle 1 is moved along the teacher path. The teacher travel mode is realized by a control process (teacher travel process) executed in response to the start instruction of the teacher travel mode. The automated driving mode is realized by a control process (regeneration travel process) executed in response to the start instruction of the automated driving mode.

Note that, in the present disclosure, the teacher travel is manual travel or automated travel in which the driver moves the vehicle 1 from a parking start position (teacher travel start position) to a parking completion position (teacher travel end position) and parks the vehicle 1 in a desired parking form. Here, the parking form is at least one of a parking position and a parking posture (azimuth) of the vehicle 1. In addition, the teacher path is a travel path of the vehicle 1 detected in the teacher travel, that is, a travel trajectory of the vehicle 1 in the teacher travel. That is, the teacher path includes information indicating the parking form. Further, the regeneration travel is automated travel in which the vehicle 1 is moved along a travel path (teacher path) in a parking operation performed in the past. That is, the regeneration travel is path storage-type automated parking in which the vehicle 1 is moved from the parking start position to the parking completion position by automated driving.

Note that the teacher travel may be manual travel or automated travel in which the vehicle 1 is moved from the parking completion position (teacher travel start position) to the parking start position (teacher travel end position) to park the vehicle 1 in a desired parking form. That is, in the regeneration travel according to the embodiment, the teacher travel may be sequentially regenerated or reversely regenerated.

The map information generation module 303 acquires a surrounding environment map that defines, as a map, an environment around the vehicle 1, that is, a surrounding environment that is a space extending along the travel path of the vehicle 1, in the teacher travel. For example, the map information generation module 303 extracts feature points from each of captured images of the front, the rear, the left, and the right of the vehicle 1, that is, a surrounding image. The map information generation module 303 acquires the surrounding environment map by defining the surrounding environment of the vehicle 1 based on the extracted feature points. Here, the surrounding environment map is an example of information regarding the travel path. In addition, the surrounding environment map is information about the surrounding environment that is a space extending along the travel path, and is an example of space information.

Note that the method of extracting feature points is not particularly limited, and a known method may be applied. For example, the map information generation module 303 extracts feature points from the surrounding image by a method such as the features from accelerated segment test (FAST) or oriented FAST and rotated BRIEF (ORB). Further, the map information generation module 303 may preferentially record a feature point satisfying a prescribed condition among the feature points extracted from the surrounding image. For example, among a plurality of peripheral images that are continuous in time series, a feature point extracted from a surrounding image having a longer distance traveled by the vehicle 1 during imaging may be preferentially selected as the feature point.

For example, the map information generation module 303 utilizes the simultaneous localization and mapping (SLAM) technique for the extracted feature points to detect coordinates indicating the position of each feature point and create the surrounding environment map (local map).

Note that, when position coordinates of each feature point are detected, the position of the vehicle 1 is detected in parallel, but the position of the vehicle 1 may be detected by combining the SLAM technique and a dead reckoning (DR) technique. In addition, the position, the speed, and the moving direction of the vehicle 1 may be calculated by using an intelligent transport system (ITS).

Note that the surrounding environment map may be defined by space information based on the output of the sonar 15 in addition to the space information based on the captured image.

In the teacher travel, the travel path detection module 304 detects the travel path of the vehicle 1 during the teacher travel based on the self-position estimation result detected by the SLAM technique and the dead reckoning technique, for example, and acquires the travel path as the teacher path. When the travel path is detected, the travel path is represented by a set of points (waypoints) existing at substantially the same distance intervals, and each point is detected as path point group data that holds, as parameters, coordinates indicating a position, an azimuth indicating a direction of the vehicle 1 at this position, and a travel speed.

As an example, the travel path detection module 304 detects the teacher path of the vehicle 1 based on the outputs of the azimuth sensor 213 and the GNSS sensor 214, which are acquired by the acquisition module 301. As an example, the travel path detection module 304 detects the teacher path of the vehicle 1 based on the rotation direction and the rotation speed of each wheel 13, which are acquired by the acquisition module 301. Note that the speed and the moving direction of the vehicle 1 may be acquired by using a vehicle speed pulse or shift information flowing through an in-vehicle network such as CAN.

The vehicle operation detection module 305 detects an operation of another vehicle accessory in addition to an operation of a vehicle accessory (in-vehicle component) for traveling with respect to the vehicle 1, and acquires the operation as vehicle operation information.

Here, the vehicle operation information is, for example, information regarding a vehicle operation on the vehicle 1 by the driver, the information indicating the presence or absence, an operation timing, a target, contents, a type, and an operation amount. Note that the vehicle operation information may be information regarding control of the vehicle 1 according to this operation, the information indicating the presence or absence, a control timing, a target, contents, a type, and a control amount. In addition, the vehicle operation information may be information regarding the behavior change of the vehicle 1 associated with the control, the information indicating the presence or absence, an operation timing, a target, contents, a type, and a change amount. Note that the vehicle operation information is not limited to the driver, and may be information regarding an operation by a passenger of the vehicle 1 or an operator who operates the vehicle 1 from the outside of the vehicle.

As an example, the vehicle operation detection module 305 detects a vehicle operation related to the blinker during teacher travel based on, for example, information from the HMI 22 or the blinker of the vehicle 1, which is acquired by the acquisition module 301, and acquires the detected vehicle operation as vehicle operation information regarding a blinker operation.

Note that the detection of the vehicle operation information is not limited to a travel period in which the driver moves the vehicle 1 from the teacher travel start position to the teacher travel end position and parks the vehicle 1 in a desired parking form, and may be performed in periods before and after the travel period. In the present disclosure, the term "during the teacher travel" means a period including a travel period of the teacher travel and periods before and after the travel period.

Note that the vehicle operation information may be detected during the regeneration travel. In this case, the vehicle operation information detected during the regeneration travel can be used in the subsequent regeneration travel. That is, in the parking assistance according to the embodiment, any regeneration travel can be handled as the teacher travel (parking operation performed in the past) for the subsequent regeneration travel. In other words, in the parking assistance according to the embodiment, the teacher data may be relearned (updated) based on the regeneration travel.

The storage unit 306 includes, for example, the ROM 32, the RAM 33, or the HDD 34. The storage unit 306 stores the teacher data generated by the teacher travel process.

As an example, the teacher data includes information indicating the surrounding environment map generated by the map information generation module 303 and information indicating the travel path (teacher path) during the teacher travel, which is detected by the travel path detection module 304. Note that, in a case where the vehicle operation is detected during the teacher travel, the teacher data further includes the vehicle operation information detected by the vehicle operation detection module 305.

The self-position estimation module 307 estimates the position and the direction (azimuth) of the vehicle 1 in the regeneration travel of the vehicle 1 based on the teacher path by the vehicle control module 311 of the vehicle 1, which will be described later.

As an example, the self-position estimation module 307 reads feature point information included in the surrounding environment map of the teacher data stored in the storage unit 306, and compares the read feature point with the feature point extracted from the current surrounding image of the vehicle 1 acquired in the regeneration travel, thereby estimating the position and the direction of the vehicle 1.

Note that the position and the direction of the vehicle 1, which are estimated by the self-position estimation module 307, may be a relative position and a relative direction with respect to a reference position and a reference direction such as a start position and a start direction in the acquired travel path, respectively. However, an absolute position and an absolute direction based on the outputs of the azimuth sensor 213 and the GNSS sensor 214 may be used.

In each of the teacher travel and the regeneration travel, the position of the vehicle 1 is not limited to the case of being acquired by using the dead reckoning technique based on the movement amount of the vehicle 1 from the reference position, and may be acquired by using known map matching or the GNSS sensor 214.

In the regeneration travel, the path following calculation module 308 acquires a travel path (teacher path) in the parking operation (teacher travel) performed in the past from the storage unit 306, and calculates a merging path which is a travel path from the current position of the vehicle 1 to the merging into the teacher path, based on the teacher path and the position of the vehicle 1 estimated by the self-position estimation module 307. The calculated merging path is stored in the storage unit 306.

The vehicle operation reproduction module 309 reproduces the vehicle behavior during the teacher travel in the regeneration travel (automated parking) based on the vehicle operation information acquired during the parking operation (during the teacher travel) performed in the past, that is, the vehicle operation information included in the information (teacher data) regarding the teacher path. Specifically, in the regeneration travel, the vehicle operation reproduction module 309 reproduces the operation (vehicle behavior) of the vehicle accessory caused by the operation acquired during the teacher travel, based on the vehicle operation information stored in the storage unit 306 and the position of the vehicle 1 estimated by the self-position estimation module 307. In other words, in the regeneration travel, the vehicle operation reproduction module 309 reproduces the vehicle behavior during the teacher travel, by using the position (position coordinates) of the vehicle 1 as a trigger. As an example, the vehicle operation reproduction module 309 reproduces the vehicle behavior during the teacher travel, at a timing of being located at the same position coordinates as the position coordinates at which the vehicle operation is started in the teacher travel, during the automated travel (regeneration travel).

As an example, the vehicle operation reproduction module 309 reproduces the result of the blinker operation detected by the vehicle operation detection module 305 during the teacher travel, that is, the vehicle behavior related to the blinker.

Note that the reproduction of the vehicle behavior during the teacher travel in the regeneration travel may mean reproduction of the vehicle operation itself for the vehicle 1, which is detected during the teacher travel, such as the movement (behavior) of the blinker lever. Alternatively, the reproduction may mean reproduction of control of the vehicle 1 according to the vehicle operation, such as simulation of a signal from the blinker lever (HMI 22). Further, the reproduction of the vehicle behavior is not limited to the case of being realized by the same vehicle control as that during the teacher travel, and may be realized by different vehicle control such as generating a control signal to be supplied to the blinker so that the behavior of the blinker is reproduced.

In addition, the vehicle behavior reproduced during the regeneration travel may be the same as the vehicle behavior detected during the teacher travel, or may conform to the vehicle behavior detected during the teacher travel. That is, the vehicle behavior reproduced during the regeneration travel may be changed from the vehicle behavior detected during the teacher travel. In other words, the reproduction of the operation of the vehicle accessory includes operating the vehicle accessory of the vehicle 1 by the vehicle control according to the vehicle control after changing the vehicle control based on the operation acquired during the teacher travel.

As an example, in a case where the vehicle operation detected by the vehicle operation detection module 305 during the teacher travel does not satisfy a predetermined reference stored in the storage unit 306, the vehicle operation reproduction module 309 may make the blinker operation to be reproduced different from that during the teacher travel. For example, in a case where the time during which the blinker blinks during the teacher travel, that is, the operation time based on the operation of the blinker acquired during the teacher travel is a short time that does not satisfy a predetermined time (reference), the vehicle operation reproduction module 309 may extend the operation time of the blinker so that the blinker blinks for a predetermined time or longer. In other words, the vehicle operation reproduction module 309 sets the operation time of the blinker during the automated parking to be longer than the operation time of the blinker during the teacher travel.

Note that the extension of the operation time of the blinker means advancing the operation start timing or delaying the operation end timing with respect to the operation timing of the blinker. In addition, in a case where the time during which the blinker blinks during the teacher travel, that is, the operation time based on the operation of the blinker acquired during the teacher travel is a long time exceeding the predetermined time (reference), the vehicle operation reproduction module 309 may shorten the operation time of the blinker. In other words, the vehicle operation reproduction module 309 may shorten the operation time of the blinker during the automated parking as compared with the operation time of the blinker during the teacher travel.

As an example, the vehicle operation reproduction module 309 may make the vehicle operation detected during the teacher travel by the vehicle operation detection module 305 vary depending on the surrounding situation of the vehicle 1 during the regeneration travel, based on the information regarding the surrounding situation of the vehicle 1.

For example, the vehicle operation reproduction module 309 may change the presence or absence of the operation of the blinker from the time of the teacher travel based on the width of the roadway, for example, when parallel parking is performed from the traveling road (roadway) of the vehicle 1 to a parking space provided along the roadway. For example, in a case where the width of the roadway is larger than a predetermined reference stored in the storage unit 306, the vehicle operation reproduction module 309 may change the behavior of the blinker so that the blinker blinks in a case where the blinker operation is not detected during the teacher driving, or may change the behavior of the blinker so that the blinker blinks for a time longer than that during the teacher travel or at an earlier timing. Alternatively, the vehicle operation reproduction module 309 may change the behavior of the blinker so that the blinker blinks in a case where the width of the roadway is smaller than a predetermined reference stored in the storage unit 306.

For example, in a case where a person or another vehicle is detected around the vehicle 1 during the automated parking, the vehicle operation reproduction module 309 may change the operation timing of the vehicle accessory or add the operation of the vehicle accessory. For example, in a case where a person or another vehicle is detected in the surroundings, the vehicle operation reproduction module 309 may change the behavior of the blinker so that the blinker blinks even in a case where the blinker operation is not detected during the teacher travel. For example, in a case where a person or another vehicle is detected in the surroundings, the vehicle operation reproduction module 309 may change the behavior of the blinker so that the blinker blinks for a longer operation time than that during the teacher travel time or at an earlier operation timing.

The output control module 310 generates assistance information regarding the parking assistance function. In addition, the output control module 310 presents the generated assistance information to the user by the HMI 22. Specifically, the output control module 310 outputs, to the HMI 22, assistance information regarding the parking assistance function and information for displaying, by the HMI 22, an operation icon for receiving an operation input by the driver, as the assistance information.

As an example, the output control module 310 outputs information for displaying a display screen including an operation icon for an instruction to call the parking assistance function to the HMI 22 as the assistance information.

As an example, the output control module 310 outputs information for displaying a menu screen for displaying each menu of the parking assistance function to the HMI 22 as the assistance information. For example, the menu screen includes an operation icon for an instruction to start the teacher travel mode and an operation icon for an instruction to start the automated driving (regeneration travel) mode.

As an example, the output control module 310 outputs information for displaying a display screen including a top view image to the HMI 22 as the assistance information in the teacher travel mode and/or the automated driving mode. Here, the top view image is a surround view image indicating information of a surrounding space of the vehicle 1. As an example, the top view image is a bird-eye view image of the vehicle 1 generated by combining surrounding images of the surroundings (for example, front, rear, left, and right) of the vehicle 1 obtained by the all-around camera 212.

For example, the display screen including the top view image further includes display of information indicating the state of the vehicle 1. Here, the display of the information indicating the state of the vehicle 1 is to display the vehicle behavior of the vehicle 1 in a pseudo manner. That is, the assistance information from the output control module 310 may include information for displaying the operation of the vehicle accessory of the vehicle 1 in a pseudo manner. According to this display, it makes it possible for the driver to easily grasp the reproduced vehicle behavior. Therefore, the driver can take measures such as stopping an unnecessary operation of the vehicle accessory or manually adding an operation of the vehicle accessory that has not been reproduced.

For example, the pseudo display of the vehicle behavior of the vehicle 1, that is, the operation of the vehicle accessory may be realized by superimposing and displaying an icon simulating the vehicle 1 on the top view image. That is, the output control module 310 may output information for displaying a display screen on which the icon simulating the vehicle 1 is superimposed and displayed on the top view image of the vehicle 1 to the HMI 22 as the assistance information in the teacher travel mode and/or the automated driving mode. Here, the icon simulating the vehicle 1 may be, for example, a CG image simulating the vehicle 1 such as a 3D vehicle model, or may be an icon indicating the vehicle accessory mounted on the vehicle 1.

For example, the output control module 310 may change the display of the vehicle accessory by the icon simulating the vehicle 1 superimposed and displayed on the top view image in conjunction with the reproduction of the operation of the vehicle accessory based on the teacher data. For example, in a case where the blinker is turned on based on the vehicle operation information during the automated parking, the blinker is turned on also on the icon in conjunction with the reproduction. For example, in a case where the side mirror is stored (folded) based on the vehicle operation information during the automated parking, the side mirror is also stored on the icon in conjunction with the reproduction.

Note that the information indicating the state of the vehicle 1 may be information indicating an operation schedule of the vehicle accessory. For example, a display screen on which icons of pins or flags or texts are superimposed and displayed at corresponding positions on the teacher path is displayed on the HMI 22, so that an event (operation of the vehicle accessory) at this position may be presented to the driver. In addition, the operation schedule of the vehicle accessory may be editable on the display screen.

Note that the information indicating the state of the vehicle 1 is not limited to the case of being superimposed and displayed on the top view image. For example, on the display screen, only a CG image or an icon simulating the vehicle 1, or only an icon or a text indicating the operation of the vehicle accessory may be displayed on the HMI 22.

Note that, in the automated driving mode, the display screen including the top view image may further include information regarding the teacher path such as the parking start position, the parking completion position, and the travel path (path).

The vehicle control module 311 controls the regeneration travel in which the vehicle 1 is moved along the teacher path and stopped in a predetermined parking form based on the information (teacher data) regarding the teacher path. Specifically, the vehicle control module 311 controls steering, braking, and acceleration/deceleration of the vehicle 1 for tracking the teacher path.

As an example, the vehicle control module 311 detects a difference between the merging path and the teacher path, and the position and the direction of the vehicle 1 based on the merging path and the teacher path stored in the storage unit 306 and the position and the direction of the vehicle 1 estimated by the self-position estimation module 307. Then, the vehicle control module 311 controls at least one of the control amounts of steering, braking, and acceleration/deceleration of the vehicle 1 to reduce the detected difference, thereby causing the vehicle 1 to track the merging path and the teacher path, and controlling the regeneration travel.

Next, a flow of a parking assistance process executed by the parking assistance device 3 configured as described above will be described. As described above, the parking assistance process executed by the parking assistance device 3 includes the teacher travel process and the regeneration travel process.

Figure 5:
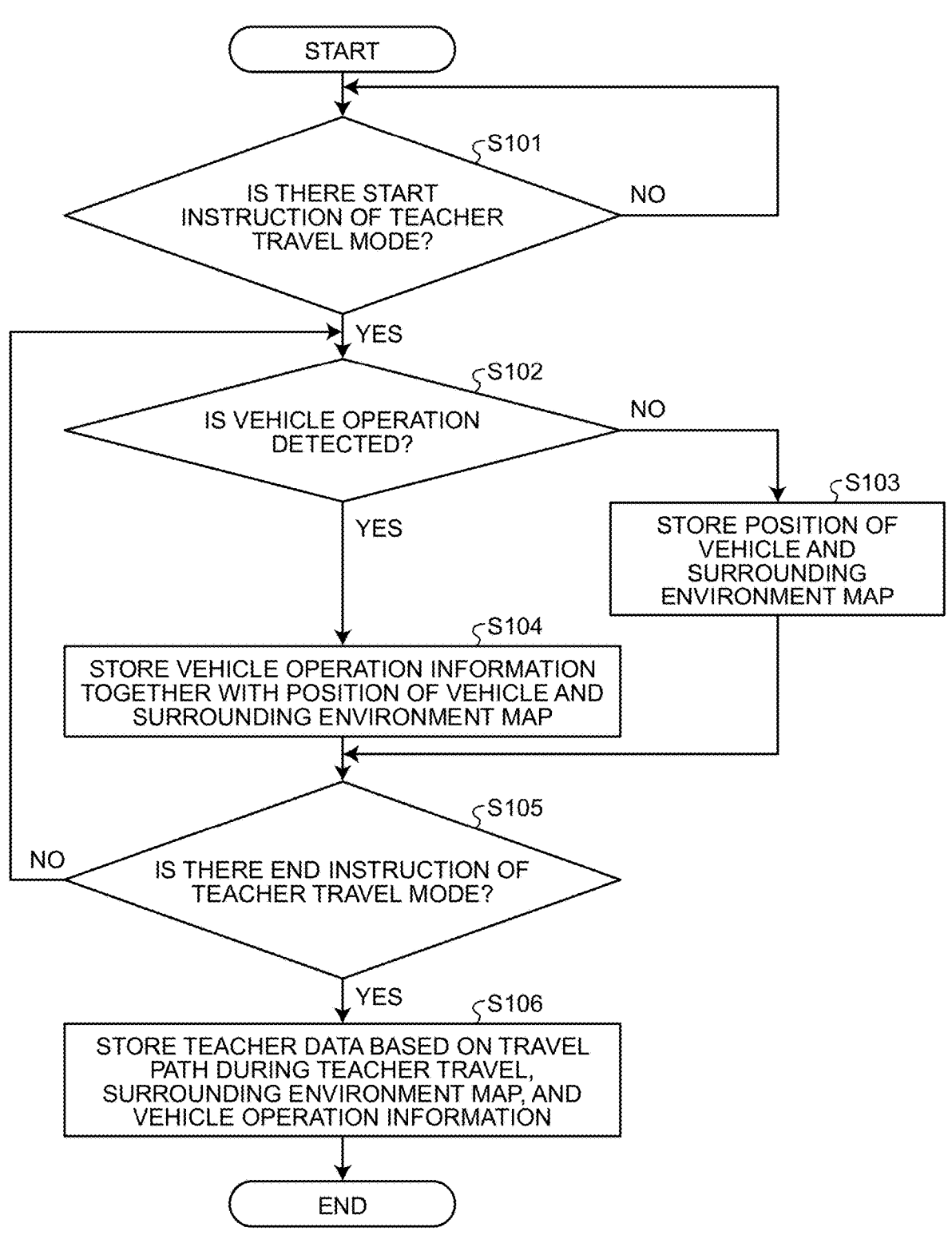
FIG. 5 is a flowchart illustrating an example of a flow of a teacher travel process executed by the parking assistance device of FIG. 1.

FIG. 5 is a flowchart illustrating an example of a flow of the teacher travel process executed by the parking assistance device 3 of FIG. 1. The flow of FIG. 5 is started, for example, after the parking assistance function call instruction is received in a state where the vehicle 1 is stopped at the teacher travel start position (parking start position).

The parking assistance device 3 determines whether there is an instruction to start the teacher travel mode from the driver (S101). In a case where there is no instruction to start the teacher travel mode (S101: No), the flow of FIG. 5 returns to the process of S101. For example, the parking assistance device 3 repeats the process of S101 at predetermined intervals (for example, an interval of 100 ms).

In a case where there is the instruction to start the teacher travel mode (S101: Yes), the parking assistance device 3 determines whether another vehicle operation of travel by the driver has been detected. In a case where no vehicle operation is detected (S102: No), the parking assistance device 3 temporarily stores the position of the vehicle 1 and the surrounding environment map in the storage unit 306 (S103). In a case where the vehicle operation is detected (S102: Yes), the parking assistance device 3 temporarily stores the vehicle operation information together with the position of the vehicle 1 and the surrounding environment map in the storage unit 306 (S104). This vehicle operation information can be stored, for example, in association with the position of the vehicle 1.

The parking assistance device 3 determines whether there is an instruction to end the teacher travel mode from the driver (S105). In a case where there is no instruction to end the teacher travel mode (S105: No), the flow of FIG. 5 returns to the process of S102. As described above, the position of the vehicle 1 is stored in chronological order, and the position data in chronological order is data indicating the movement path during the teacher travel. In a case where there is the instruction to end the teacher travel mode (S105: Yes), the parking assistance device 3 generates teacher data to be referred to during the automated driving mode (regeneration travel process) based on the travel path (teacher path) indicated by the position data stored in chronological order during the teacher travel, the surrounding environment map along the travel path, and the vehicle operation information, and stores the generated teacher data in the storage unit 306 (S106). Thereafter, the flow of FIG. 5 ends.

Figure 6:
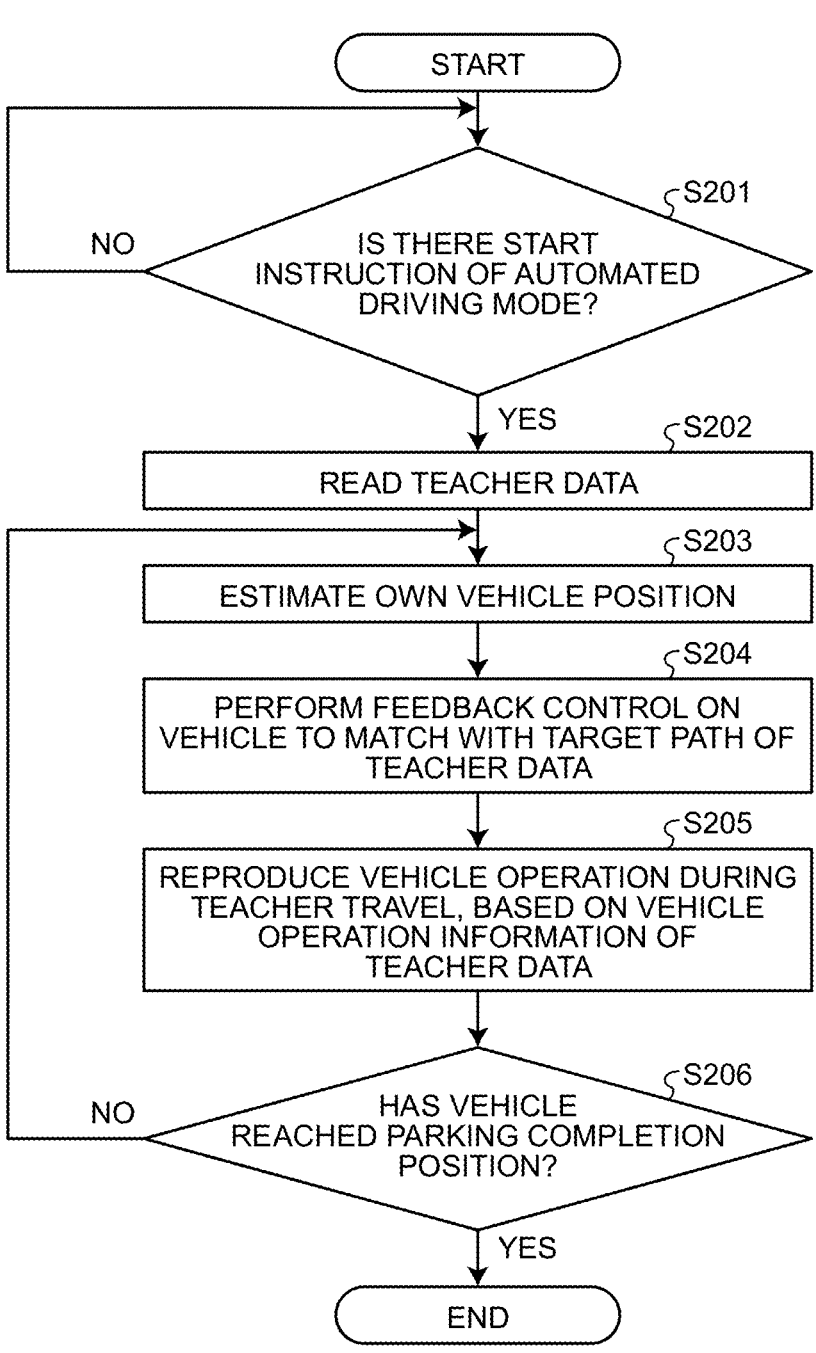
FIG. 6 is a flowchart illustrating an example of a flow of a regeneration travel process executed by the parking assistance device of FIG. 1.

FIG. 6 is a flowchart illustrating an example of a flow of the regeneration travel process executed by the parking assistance device 3 of FIG. 1. The flow of FIG. 6 is started, for example, after the parking assistance function call instruction is received in a state where the vehicle 1 is stopped at the parking start position.

The parking assistance device 3 determines whether there is an instruction to start the automated driving mode from the driver (S201). In a case where there is no instruction to start the automated driving mode (S201: No), the flow of FIG. 6 returns to the process of S201. For example, the parking assistance device 3 repeats the process of S201 at predetermined intervals (for example, an interval of 100 ms).

In a case where there is the instruction to start the automated driving mode (S201: Yes), the parking assistance device 3 reads the teacher data from the storage unit 306 (S202). Thereafter, while estimating the own vehicle position (S203), the parking assistance device 3 moves the vehicle 1 by performing feedback control to match with a target path (teacher path) of the teacher data (S204), and reproduces the vehicle operation (vehicle behavior) during the teacher travel based on the vehicle operation information of the teacher data (S205).

Thereafter, the parking assistance device 3 determines whether the vehicle 1 has reached the goal position (parking completion position) of the target path indicated by the teacher data (S206). In a case where the vehicle has not reached the parking completion position (S206: No), the flow of FIG. 6 returns to the process of S203. In a case where the vehicle 1 has reached the parking completion position (S206: Yes), the parking assistance device 3 stops the vehicle 1, and then the flow of FIG. 6 ends.

As described above, the parking assistance device 3 according to the embodiment is configured to detect the vehicle operation information regarding the path storage-type automated parking in the teacher travel mode and regarding the operation of the blinker (vehicle accessory) of the vehicle 1 together with the teacher path during the teacher travel. In addition, in the automated driving mode, the parking assistance device 3 is configured to move the vehicle 1 along the travel path (teacher path) in the parking operation performed in the past, and reproduce the operation of the blinker caused by the operation detected during the parking operation (teacher travel) performed in the past.

According to this configuration, in the path storage-type automated parking in which the vehicle 1 automatically travels based on the parking operation performed in the past, it is possible to perform automated control of the vehicle accessory such as the blinker, and to improve safety and convenience to the surroundings. Thus, according to the above configuration, it is possible to appropriately assist the path storage-type automated parking.

Note that, in the above-described embodiment, the blinker (direction indicator) mounted on the vehicle 1 has been exemplified as the vehicle accessory of a target for acquiring the vehicle operation information, that is, the target for reproducing the operation, but the present invention is not limited thereto. The target vehicle operation acquired as the vehicle operation information only needs to be a vehicle operation that can improve the safety of the surroundings during the regeneration travel, the safety of the vehicle 1 or the driver, or the convenience of the driver, by the recording and reproduction thereof. For example, the vehicle operation of the target is not limited to the blinker operation, and may be various vehicle accessory operations such as a side mirror operation, a hazard lamp (emergency blinking display lamp) operation, a headlight (headlamp) operation, a position lamp (outer contour light) operation, and a door operation. By reproducing these operations, it is possible to improve the safety around the vehicle 1 and the safety and convenience of the vehicle 1 (driver).

As an example, the vehicle accessory of the target for reproducing the operation in the parking assistance device 3 according to the above-described embodiment may be the side mirror mounted on the vehicle 1 in addition to or instead of the blinker.

For example, the parking assistance device 3 can detect that the side mirror is folded (stored) during the teacher travel, such as a case of parking in a narrow parking space. For example, the vehicle operation detection module 305 may detect the vehicle operation related to the development/ storage of the side mirror during the teacher travel based on, for example, the information from the HMI 22 and the side mirror acquired by the acquisition module 301, and acquire the vehicle operation as the vehicle operation information regarding the side mirror operation.

For example, the vehicle operation reproduction module 309 may change the operation (vehicle behavior) of the side mirror reproduced during the regeneration travel from the vehicle behavior detected during the teacher travel, based on the information regarding the surrounding situation of the vehicle 1.

For example, the vehicle operation reproduction module 309 may change the presence or absence of the operation of the side mirror from the time of the teacher travel based on the width of the parking space of the vehicle 1, that is, the size of the surrounding space of the vehicle 1 at the parking completion position. For example, in a case where the width of the parking space is smaller than a predetermined width (reference) that is determined in advance and stored in the storage unit 306, the vehicle operation reproduction module 309 may change the behavior of the side mirror to be folded even in a case where the operation of the side mirror is not detected during the teacher travel, or may advance the operation timing of the side mirror to be folded at a timing earlier than the time of the teacher travel (for example, before the start of automated parking). Note that the predetermined width used as the reference is, for example, obtained by adding a predetermined margin in consideration of the risk of collision or contact to the size of the vehicle 1. As described above, according to the configuration in which automated parking is performed with a margin provided according to the surrounding situation of the vehicle 1, it is possible to reduce the risk of collision or contact and to improve the safety in automated parking.

For example, in a case where there is a person or another vehicle around the vehicle, the vehicle operation reproduction module 309 may add an operation to fold the side mirror even in a case where the side mirror operation is not detected during the teacher travel, or may advance the operation timing of the side mirror to be folded at a timing earlier than that during the teacher driving.

As an example, the vehicle accessory of the target for reproducing the operation in the parking assistance device 3 according to the above-described embodiment may be a hazard lamp mounted on the vehicle 1 in addition to or instead of at least one of the blinker and the side mirror. The vehicle accessory as the hazard lamp may be the same vehicle accessory as the blinker or may be a different vehicle accessory.

As an example, the vehicle accessory of the target for reproducing the operation in the parking assistance device 3 according to the above-described embodiment may be a light mounted on the vehicle 1 in addition to or instead of at least one of the blinker and the side mirror. The light includes, for example, at least one of a headlight (headlamp) and a position lamp (outer contour light).

For example, the parking assistance device 3 can detect that the hazard lamp or the light is turned on/off during the teacher travel. For example, the vehicle operation detection module 305 may detect a vehicle operation related to turning on/off of the hazard lamp or the light during the teacher travel based on, for example, the information from the HMI 22, the hazard lamp, or the light, which is acquired by the acquisition module 301, and acquire the vehicle operation as vehicle operation information regarding the hazard lamp operation or the light operation.

For example, the vehicle operation reproduction module 309 may change the operation (vehicle behavior) of the hazard lamp or the light reproduced during the regeneration travel from the vehicle behavior detected during the teacher travel, based on the information regarding the surrounding situation of the vehicle 1.

For example, in a case where there is a person or another vehicle around, even in a case where the hazard lamp operation or the light operation is not detected during the teacher travel, the vehicle operation reproduction module 309 may add an operation to turn on, advance the operation timing to turn on at a timing earlier than the time of teacher travel, or delay the operation timing to turn off at a timing later than the time of teacher travel.

In addition, for example, the parking assistance device 3 may acquire an output from an in-vehicle sensor such as a raindrop sensor mounted on the vehicle 1, a sensor that acquires a wiper operation, or an illuminance sensor, as information regarding the weather or illuminance. In addition, the parking assistance device 3 may acquire information regarding the weather on the Internet by, for example, communication with the outside of the vehicle 1 via the I/F 35. In addition, the parking assistance device 3 may acquire information regarding the illuminance around the vehicle 1 such as in a tunnel or a multi-story parking lot based on an output from the GNSS sensor 214 and map data, or an output from a car navigation device mounted on the vehicle 1.

For example, the vehicle operation reproduction module 309 may change the vehicle behavior detected during the teacher travel, based on at least one of the weather and the illuminance during the automated parking. For example, in the case of weather or illuminance satisfying a predetermined condition (reference) determined in advance and stored in the storage unit, such as a case of rainy or cloudy weather, or a case of nighttime, inside a tunnel, or inside a multi-story parking lot, the vehicle operation reproduction module 309 may change the vehicle behavior from the vehicle behavior detected during the teacher travel. For example, in the case of the weather or illuminance satisfying the predetermined condition (reference), even in a case where the hazard lamp operation or the light operation is not detected during the teacher travel, the vehicle operation reproduction module 309 may add an operation to turn on, advance the operation timing to turn on at a timing earlier than the time of teacher travel, or delay the operation timing to turn off at a timing later than the time of teacher travel.

As an example, the vehicle accessory of the target for reproducing the operation in the parking assistance device 3 according to the above-described embodiment may be a door mounted on the vehicle 1 in addition to or instead of at least one of the blinker and the side mirror.

For example, the parking assistance device 3 can detect the degree of opening of the door such as the opening/closing amount and the opening/closing speed during the teacher travel, for example, at the parking completion position. For example, the vehicle operation detection module 305 may detect a vehicle operation related to the degree of opening of the door during the teacher travel based on, for example, information from the HMI 22 or an opening/closing sensor (in-vehicle sensor) provided on the door, which is acquired by the acquisition module 301, and acquire the vehicle operation as vehicle operation information regarding the degree of opening of the door.

For example, the vehicle operation reproduction module 309 may limit the operation of the door during the regeneration travel based on vehicle operation information regarding at least one of the opening/closing amount and the opening/closing speed of the door of the vehicle 1. For example, in a case where the door is opened only half during the teacher travel, the vehicle operation reproduction module 309 may limit the opening/closing amount of the door so that the door is opened only half in the regeneration travel. For example, in a case where the door is slowly opened during the teacher travel, the vehicle operation reproduction module 309 may limit the opening/closing speed of the door so that the door is opened only at a speed equal to or less than the speed in the teacher travel in the regeneration travel.

For example, in a case where the vehicle 1 is located on a road such as a public road (in other words, except for the parking lot and the private road), based on the output from the GNSS sensor 214 and the map data, or the output from the car navigation device mounted on the vehicle 1, the parking assistance device 3 does not need to receive a start instruction of the teacher travel mode or a start instruction of the automated driving (regeneration travel) mode. For example, the output control module 310 may change the operation icon for an instruction to start the teacher travel mode or the operation icon for an instruction to start the automated driving mode to be grayed out on the menu screen for displaying each menu of the parking assistance function, and output the grayed out icon to the HMI 22. Alternatively, since the vehicle is located on a public road, the output control module 310 may notify the user that the start of the teacher travel mode is not received or that the start of the regeneration travel is not received. Note that the output control module 310 may make a notification on the menu screen, may make a screen transition from the menu screen to make a notification, may make a notification by pop-up display, or may make a notification by voice or notification sound.

Note that, in the above embodiment, "determining whether it is A" may be "determining that it is A", "determining that it is not A", or "determining whether it is A".

The program executed by the parking assistance device 3 in the above-described embodiment may be provided by being recorded in a computer-readable recording medium such as a CD-ROM, an FD, a CD-R, a DVD, or an SD card, as a file in an installable format or an executable format.

In addition, the program executed by the parking assistance device 3 in the above-described embodiment may be stored on a computer connected to a network such as the Internet and provided by being downloaded via the network. In addition, the program executed by the parking assistance device 3 may be provided or distributed via a network such as the Internet.

In addition, the program executed by the parking assistance device 3 in the above-described embodiment may be configured to be provided by being incorporated in advance in the ROM or the like.

In addition, the program executed by the parking assistance device 3 in the above-described embodiment has a module configuration including the above-described functional units (acquisition module 301, reception module 302, map information generation module 303, travel path detection module 304, vehicle operation detection module 305, storage unit 306, self-position estimation module 307, path following calculation module 308, vehicle operation reproduction module 309, output control module 310, and vehicle control module 311). As the actual hardware, the CPU 31 reads and executes the program from the ROM 32 or the HDD 34, whereby the functional units are loaded onto the RAM 33, and the functional units are generated on the RAM 33.

According to at least one embodiment described above, it is possible to appropriately assist the path storage-type automated parking.

According to the present disclosure, it is possible to appropriately support path storage-type automated parking.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

Supplementary Notes

The following techniques are disclosed by the above description of the above embodiment.

(1) A parking assistance method of performing automated travel of a vehicle based on a parking operation performed in past, the method including:

acquiring a teacher path based on a travel path in the parking operation performed in the past;

acquiring vehicle operation information regarding an operation of at least one vehicle accessory of a blinker and a side mirror in the vehicle during the parking operation performed in the past;

storing teacher data including the teacher path and the vehicle operation information; and reproducing an operation of the vehicle accessory caused by the operation acquired during the parking operation performed in the past, based on the teacher data in automated parking in which the vehicle is moved along the teacher path.

(2) In the parking assistance method according to (1), the reproducing the operation of the vehicle accessory includes operating the vehicle accessory after changing vehicle control based on the operation acquired during the parking operation performed in the past.

(3) In the parking assistance method according to (2), the changing the vehicle control includes lengthening an operation time of the blinker to be equal to or longer than a predetermined time when an operation time based on the operation of the blinker acquired during the parking operation performed in the past is shorter than a predetermined time.

(4) In the parking assistance method according to (2) or (3), the changing the vehicle control includes changing presence or absence of the operation of the blinker based on a width of a traveling road of the vehicle during the parking operation performed in the past.

(5) In the parking assistance method according to any one of (2) to (4), the changing the vehicle control includes changing presence or absence of the operation of the side mirror based on a width of a parking space of the vehicle during the parking operation performed in the past.

(6) In the parking assistance method according to any one of (2) to (5), the changing the vehicle control includes advancing an operation timing of the side mirror when a width of a parking space of the vehicle during the parking operation performed in the past is narrower than a predetermined width.

(7) In the parking assistance method according to any one of (2) to (6), the changing the vehicle control includes changing an operation timing or adding an operation for at least one of the blinker and the side mirror when a person or another vehicle is detected around the vehicle during the automated parking.

(8) In the parking assistance method according to any one of (1) to (7), the vehicle accessory of the vehicle further includes at least one of a hazard lamp, a headlight, a position lamp, and a door.

(9) In the parking assistance method according to any one of (1) to (8), further including:

further acquiring the vehicle operation information regarding an operation of a headlight of the vehicle during the parking operation performed in the past; and reproducing, in the automated parking, the operation of the headlight caused by the operation acquired during the parking operation performed in the past, based on the teacher data, in which the reproducing the operation of the headlight includes operating the headlight after changing vehicle control based on the operation acquired during the parking operation performed in the past, based on at least one of weather and illuminance during the automated parking.

(10) In the parking assistance method according to any one of (1) to (9), further including:

further acquiring the vehicle operation information regarding at least one of an opening/closing amount and an opening/closing speed of a door of the vehicle during the parking operation performed in the past; and limiting an operation of the door based on the teacher data in the automated parking.

(11) In the parking assistance method according to any one of (1) to (10), further including:

outputting assistance information for displaying a display screen on which an icon simulating the vehicle is superimposed and displayed on a bird-eye view image of the vehicle generated by combining surrounding images of the vehicle; and changing a display of the vehicle accessory by the icon in conjunction with the operation of the vehicle accessory in the automated parking.

(12) A parking assistance device that performs automated travel of a vehicle based on a parking operation performed in past, the parking assistance device including:

a processor; and a memory having instructions that, when executed by the processor, cause the processor to perform operations including:

acquiring a teacher path based on a travel path during the parking operation performed in the past, and acquiring vehicle operation information regarding an operation of at least one vehicle accessory of a blinker and a side mirror in the vehicle during the parking operation performed in the past;

causing the memory to store teacher data including the teacher path and the vehicle operation information; and reproducing an operation of the vehicle accessory caused by the operation acquired during the parking operation performed in the past, based on the teacher data in automated parking in which the vehicle is moved along the teacher path.

(13) A parking assistance device including:

at least one processor; and a memory storing at least one program executed by at least the one processor, in which at least the one processor is configured to implement the parking assistance method according to any one of (1) to (11) by executing at least the one program.

(14) A program for causing a computer to execute the parking assistance method according to any one of (1) to (11).

(15) A computer program product in which the program according to (14), which is executed by a computer, is recorded.

(16) A vehicle including:

the parking assistance device according to (12) or (13); and an operation unit that receives an operation of the vehicle accessory by a user.

(17) A vehicle including:

the parking assistance device according to (13), in which at least the one processor is configured to implement the parking assistance method according to (11); and a display device that displays the display screen based on the assistance information from the parking assistance device.

23

(18) A vehicle including:
  the parking assistance device according to (12) or (13); and
  a control device that controls at least one of a steering angle, driving, and braking based on a control signal from the regeneration module.

(19) A vehicle including:
  the parking assistance device according to (12) or (13); and
  at least one of a sonar, an all-around camera, a steering angle sensor, a wheel speed sensor, an azimuth sensor, and a GNSS sensor.

What is claimed is:

1. A parking assistance method of performing automated travel of a vehicle based on a parking operation performed in past, the method comprising:
  acquiring a teacher path based on a travel path in the parking operation performed in the past;
  acquiring vehicle operation information regarding an operation of at least one vehicle accessory of a blinker and a side mirror in the vehicle during the parking operation performed in the past;
  storing teacher data including the teacher path and the vehicle operation information; and
  reproducing an operation of the vehicle accessory caused by the operation acquired during the parking operation performed in the past, based on the teacher data in automated parking in which the vehicle is moved along the teacher path.

2. The parking assistance method according to claim 1, wherein
  the reproducing the operation of the vehicle accessory includes operating the vehicle accessory after changing vehicle control based on the operation acquired during the parking operation performed in the past.

3. The parking assistance method according to claim 2, wherein
  the changing the vehicle control includes lengthening an operation time of the blinker to be equal to or longer than a predetermined time when an operation time based on the operation of the blinker acquired during the parking operation performed in the past is shorter than the predetermined time.

4. The parking assistance method according to claim 2, wherein
  the changing the vehicle control includes changing presence or absence of the operation of the blinker based on a width of a traveling road of the vehicle during the parking operation performed in the past.

5. The parking assistance method according to claim 3, wherein
  the changing the vehicle control includes changing presence or absence of the operation of the blinker based on a width of a traveling road of the vehicle during the parking operation performed in the past.

6. The parking assistance method according to claim 2, wherein
  the changing the vehicle control includes changing presence or absence of the operation of the side mirror based on a width of a parking space of the vehicle during the parking operation performed in the past.

7. The parking assistance method according to claim 3, wherein
  the changing the vehicle control includes changing presence or absence of the operation of the side mirror based on a width of a parking space of the vehicle during the parking operation performed in the past.

8. The parking assistance method according to claim 4, wherein
  the changing the vehicle control includes changing presence or absence of the operation of the side mirror based on a width of a parking space of the vehicle during the parking operation performed in the past.

9. The parking assistance method according to claim 2, wherein
  the changing the vehicle control includes advancing an operation timing of the side mirror when a width of a parking space of the vehicle during the parking operation performed in the past is narrower than a predetermined width.

10. The parking assistance method according to claim 3, wherein
  the changing the vehicle control includes advancing an operation timing of the side mirror when a width of a parking space of the vehicle during the parking operation performed in the past is narrower than a predetermined width.

11. The parking assistance method according to claim 4, wherein
  the changing the vehicle control includes advancing an operation timing of the side mirror when a width of a parking space of the vehicle during the parking operation performed in the past is narrower than a predetermined width.

12. The parking assistance method according to claim 2, wherein
  the changing the vehicle control includes changing an operation timing or adding an operation for at least one of the blinker and the side mirror when a person or another vehicle is detected around the vehicle during the automated parking.

13. The parking assistance method according to claim 3, wherein
  the changing the vehicle control includes changing an operation timing or adding an operation for at least one of the blinker and the side mirror when a person or another vehicle is detected around the vehicle during the automated parking.

14. The parking assistance method according to claim 4, wherein
  the changing the vehicle control includes changing an operation timing or adding an operation for at least one of the blinker and the side mirror when a person or another vehicle is detected around the vehicle during the automated parking.

15. The parking assistance method according to claim 1, wherein
  the vehicle accessory of the vehicle further includes at least one of a hazard lamp, a headlight, a position lamp, and a door.

16. The parking assistance method according to claim 1, further comprising:
  further acquiring the vehicle operation information regarding an operation of a headlight of the vehicle during the parking operation performed in the past; and
  reproducing, in the automated parking, the operation of the headlight caused by the operation acquired during the parking operation performed in the past, based on the teacher data, wherein
  the reproducing the operation of the headlight includes operating the headlight after changing vehicle control based on the operation acquired during the parking operation performed in the past, based on at least one of weather and illuminance during the automated parking.

17. The parking assistance method according to claim 1, further comprising:

further acquiring the vehicle operation information regarding at least one of an opening/closing amount and an opening/closing speed of a door of the vehicle during the parking operation performed in the past; and limiting an operation of the door based on the teacher data in the automated parking.

18. The parking assistance method according to claim 1, further comprising:

outputting assistance information for displaying a display screen on which an icon simulating the vehicle is superimposed and displayed on a bird-eye view image of the vehicle generated by combining surrounding images of the vehicle; and changing a display of the vehicle accessory by the icon in conjunction with the operation of the vehicle accessory in the automated parking.

19. A parking assistance device that performs automated travel of a vehicle based on a parking operation performed in past, the parking assistance device comprising:

a processor; and a memory having instructions that, when executed by the processor, cause the processor to perform operations comprising:

acquiring a teacher path based on a travel path during the parking operation performed in the past, and acquiring vehicle operation information regarding an operation of at least one vehicle accessory of a blinker and a side mirror in the vehicle during the parking operation performed in the past;

causing the memory to store teacher data including the teacher path and the vehicle operation information; and reproducing an operation of the vehicle accessory caused by the operation acquired during the parking operation performed in the past, based on the teacher data in automated parking in which the vehicle is moved along the teacher path.

\* \* \* \* \*